United States Patent [19]

Rupert

[11] Patent Number: 5,460,264
[45] Date of Patent: Oct. 24, 1995

[54] RECYCLABLE BEVERAGE PACKAGE WITH BLOW MOLDED PLASTIC CONTAINER AND OXYGEN BARRIER WRAP

[75] Inventor: Samuel J. Rupert, Ann Arbor, Mich.

[73] Assignee: Ecco, Inc., Ann Arbor, Mich.

[21] Appl. No.: 313,539

[22] Filed: Sep. 27, 1994

Related U.S. Application Data

[63] Continuation of Ser. No. 151,958, Nov. 15, 1993, abandoned, which is a continuation-in-part of Ser. No. 54,097, Apr. 30, 1993, abandoned.

[51] Int. Cl.$^6$ .......................... B65D 77/00; B65D 65/00; B65D 23/00
[52] U.S. Cl. .......................... 206/217; 220/710; 206/497
[58] Field of Search ..................... 206/217, 434, 206/497; 215/1 A, 1 C; 220/710, 449, 706; 229/89

[56] References Cited

U.S. PATENT DOCUMENTS

| | | | |
|---|---|---|---|
| 2,013,475 | 9/1935 | Orton | 206/217 X |
| 3,332,567 | 7/1967 | Pugh, Sr. | 220/710 X |
| 3,445,033 | 5/1969 | Sweet et al. | 215/1 A X |
| 3,541,753 | 11/1970 | Katz | 206/497 X |
| 4,051,265 | 9/1977 | Kirshenbaum et al. | 206/497 X |
| 4,963,419 | 10/1990 | Lustig et al. | 206/497 X |
| 5,054,631 | 10/1991 | Robbins, III | 215/1 A |
| 5,253,779 | 10/1993 | Lee | 220/706 X |

FOREIGN PATENT DOCUMENTS

| | | | |
|---|---|---|---|
| 2532678 | 2/1976 | Germany | 215/1 A |

Primary Examiner—Paul T. Sewell
Assistant Examiner—BethAnne C. Cicconi
Attorney, Agent, or Firm—Harness, Dickey & Pierce

[57] ABSTRACT

A beverage package having a blow molded plastic container of a single resin that is filled with a beverage product and sealed. The sealed container is wrapped in an oxygen barrier film to prevent oxygen from contacting the container and permeating through the container wall and thereby spoiling the beverage. The wrap is separable from the container before the beverage is consumed resulting in two separate, single material components for easy recycling. The molded container includes an upright side wall having a recessed groove sized to receive and store a telescoping straw for use in drinking the contents of the container.

3 Claims, 3 Drawing Sheets

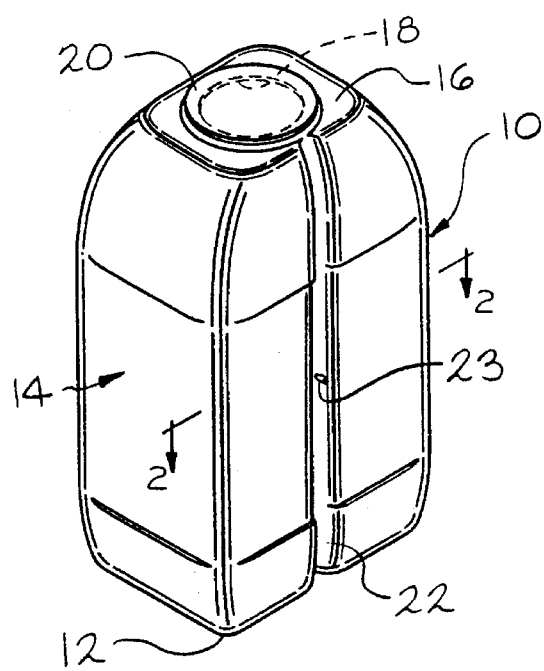
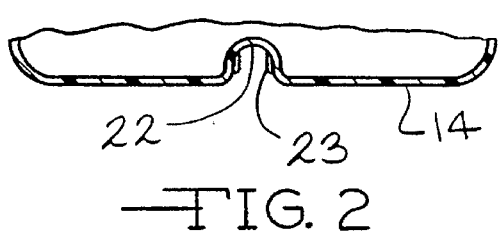
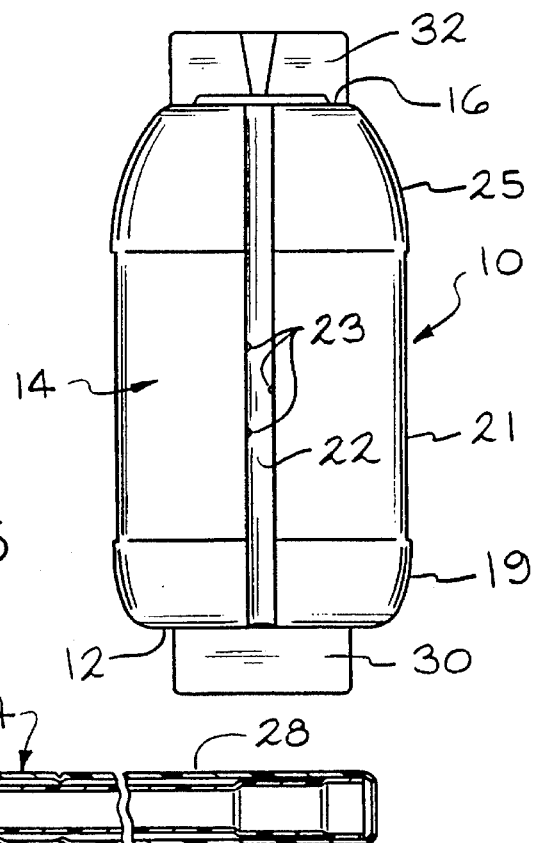
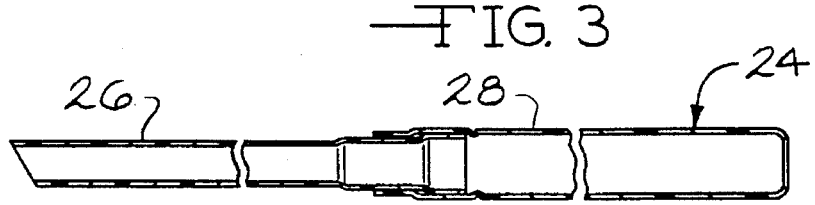

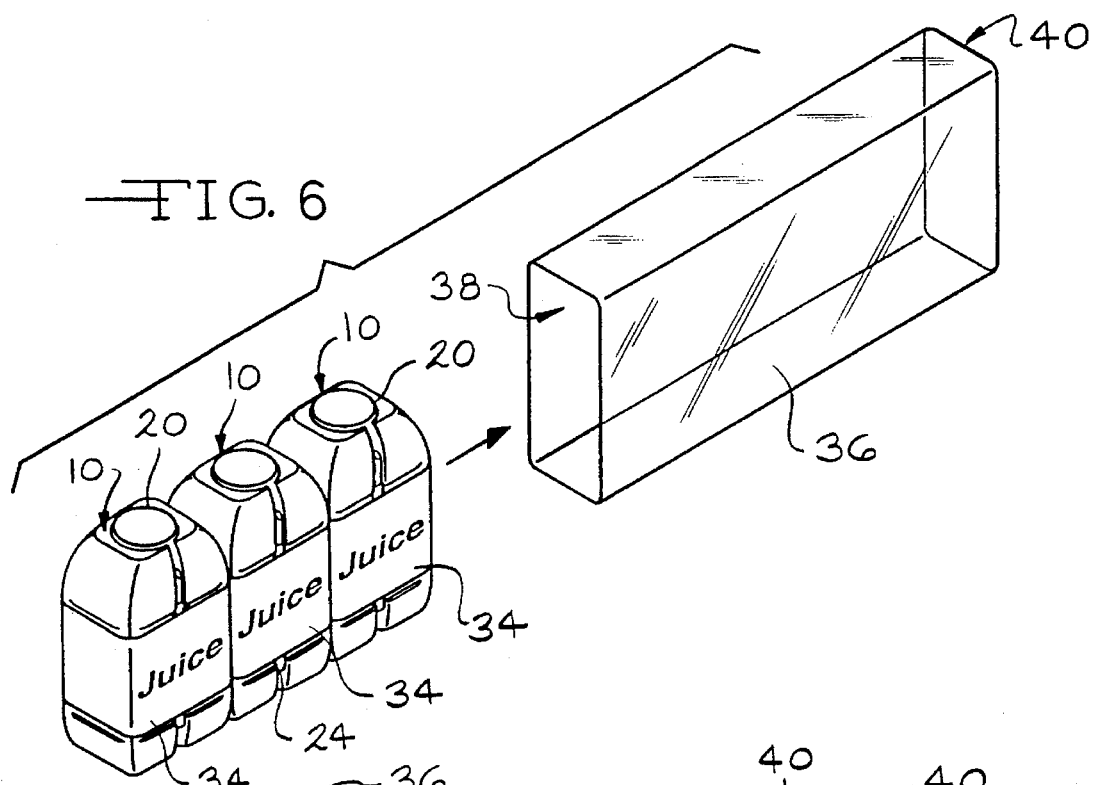
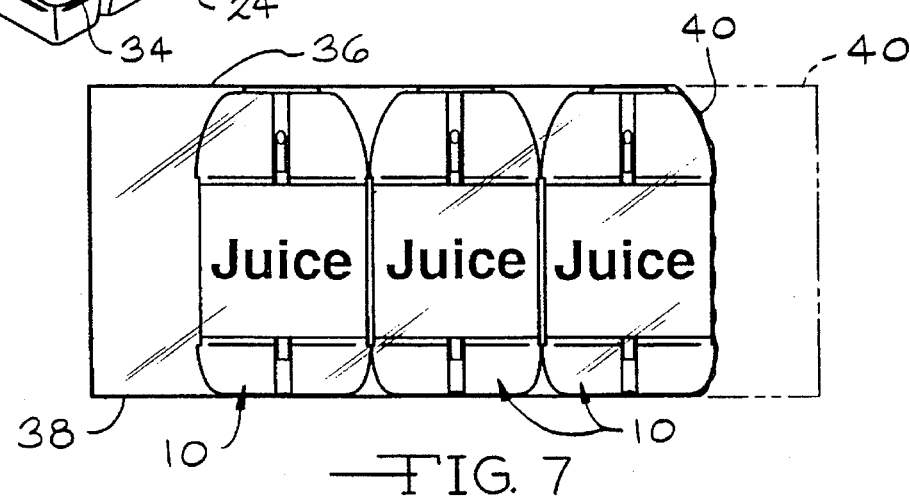
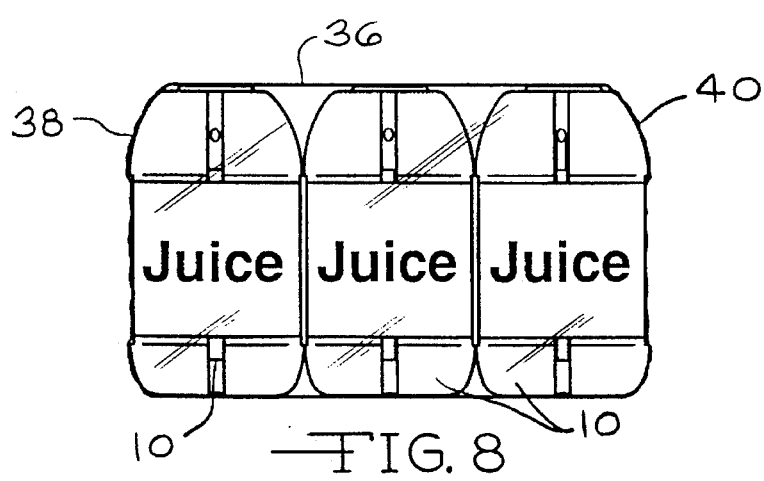

5,460,264

RECYCLABLE BEVERAGE PACKAGE WITH BLOW MOLDED PLASTIC CONTAINER AND OXYGEN BARRIER WRAP

CROSS REFERENCE TO RELATED APPLICATION

This application is a continuation of U.S. patent application Ser. No. 08/151,958, filed Nov. 15, 1993, now abandoned, which is a continuation-in-part of application Ser. No. 08/054 097 filed Apr. 30, 1993, now abandoned.

BACKGROUND AND SUMMARY OF THE INVENTION

The present invention relates to a package for a beverage and in particular to an aseptic beverage container of blow molded plastic with an oxygen barrier wrap surrounding the container.

In recent years, the cardboard "juice box" has become a popular package for fruit juices and other beverages sold in a single service size container. Such juice boxes are popular because their low cost makes them disposable. However, to form a container having the necessary properties to store and preserve the contents, the present day juice boxes are constructed of several layers of different materials laminated together. The individual layers can not be efficiently separated for recycling of the various materials. As a result, the containers are deposited in landfills or incinerated rather than being recycled.

Accordingly, it is an object of the present invention to provide a single service "juice box" container of easily recyclable materials and of a construction which enables the different materials to be readily separated for recycling.

The beverage package of the present invention consists of a blow molded plastic container that is generally rectangular in shape. The blow molded container is made of a single plastic resin such as high density polyethylene (HDPE) for which a recycled resin market has already been developed. However, since HDPE is oxygen permeable, the plastic container is hermetically sealed in a high barrier film to form an oxygen barrier around the container. The barrier prevents exposure of the container to oxygen, thus increasing the product shelf-life.

The barrier wrap and the blow molded container are separated from one another when the beverage is consumed. The result is two separate components, each of a single material and each readily recycled.

In a preferred embodiment, the blow molded container includes a recessed groove in its side wall for placement of a straw therein. A telescoping straw is used which enables, the straw to be packaged at a length less than the height of the container. Accordingly, a bend in the straw is no longer required. By placing the straw in a recessed groove in the container, the straw need not extend outwardly from the side of the container where it can be accidentally removed and lost.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the blow molded container used in the beverage package of the present invention;

FIG. 2 is a sectional view of the container side wall as seen from substantially the line 2—2 of FIG. 1;

FIGS. 3 and 4 are plan views of the telescoping straw used with the package of the present invention;

FIG. 5 is a front elevation view of the container as blow molded showing the top and bottom mold flash;

FIG. 6 is a perspective view showing three blow molded containers being inserted into a barrier film wrap;

FIG. 7 is a front view of the three containers within the barrier wrap with one end closed and sealed;

FIG. 8 is a front view similar to FIG. 7 with both ends of the barrier wrap closed and sealed;

DETAILED DESCRIPTION OF THE INVENTION

Figure 9:
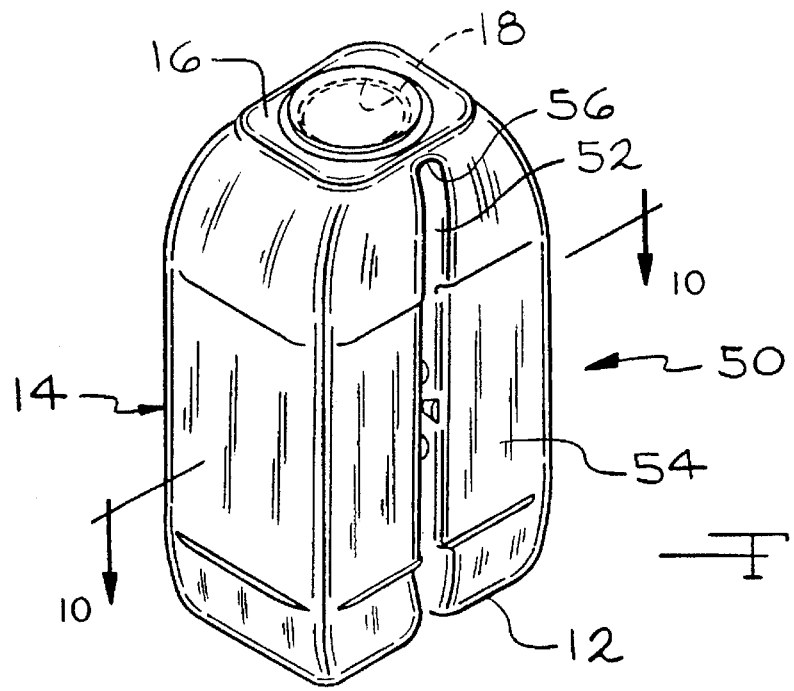
FIG. 9 is a perspective view of an alternative embodiment of the blow molded container used in the beverage package of the present invention.
Figure 11:
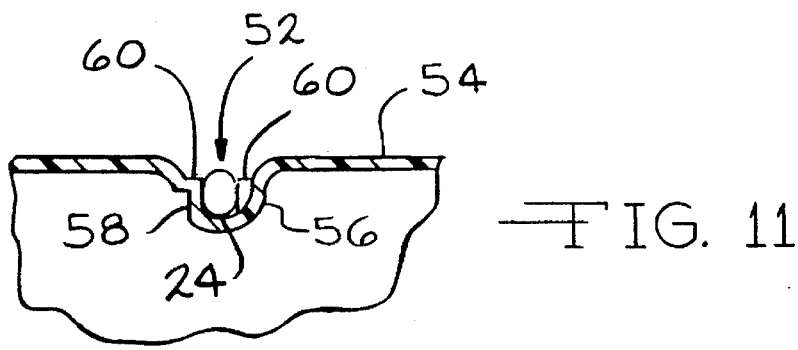
FIG. 11 is an enlarged fragmentary sectional view, like FIG. 10, showing a straw positioned in a groove in the side wall of the container of this invention.

The beverage package of the present invention includes a blow molded container 10 shown in FIG. 1. Container 10 includes a bottom wall 12, an upright side wall 14 and a top wall 16. The general configuration of the container 10 is rectangular, however other shapes can be used as desired. The top wall 16 includes an opening 18 through which the container 10 is filled with a beverage and through which the beverage is withdrawn when consumed. A strippable seal member 20 formed for example of a foil material or the like, is secured by an adhesive to the top wall 16 around the periphery of the opening 18 to close and seal the container.

The container side wall 14 is formed with a recessed groove 22 which is used to house a straw 24 for use in drinking the beverage from the container 10. The straw 24, shown in FIGS. 3 and 4, is a telescoping straw having an inner tube 26 and an outer tube 28. By telescopically collapsing the straw as shown in FIG. 3, the overall length of the straw is less than the height of the container 10. This permits the straw to be contained within the recessed groove 22 and eliminates the need for a bendable straw. The straw 24 is preferably contained within a sealed plastic wrap, not shown, to keep the straw 24 clean. Resilient projections 23 formed in the groove 22 are used to hold the straw within the groove. Alternatively, a small amount of adhesive can be used to mount the straw.

The container 10 is molded with a bottom flash 30 and a top flash 32, as shown in FIG. 5, extending below and above the container. The top flash 32 is formed so as to close the opening 18, leaving the container sterile and sealed as it exits from the blow molding machine. The sealed container is conveyed into a clean room having a controlled environment. The top flash 32 is removed to open the sterile container inside the clean room. The container is then filled with a beverage product and is closed with the seal member 20.

The container side wall 14 has three distinct portions, a lower portion 19, a main central portion 21 and an upper portion 25. In the base portion 19, the side wall tapers outwardly and upwardly from the bottom wall 12 as best seen in FIG. 5. In the main portion 21, the horizontal cross sectional size and shape of the side wall is substantially constant. In the upper portion 25, the side wall gradually tapers in cross sectional size toward the top wall 16. The top wall 16 is smaller than the bottom wall 12. This provides the container with increased vertical strength around the opening 18 so that the container can withstand the vertical load applied when the seal 20 is placed on the top wall. In addition, the opening 18 substantially consumes the top wall 16, having a diameter that is at least as large as half of the length of the top wall 16. This ensures that the vertical load on the container when the seal member is applied to the top wall is applied near the side wall where the top wall is supported.

Further processing occurs after the filled and sealed container exits the clean room. The straw 24 is mounted in the groove 22 and a label 34 is wrapped around the main central portion 21 of the container.

The final step in the packaging process is the application of the barrier film wrap. With reference to FIG. 6, three filled containers 10 are shown being inserted into a film wrap 36. The film wrap 36 is in the form of a sleeve having two open ends 38 and 40. After the containers are inserted into the film wrap 36, one end of the film wrap 36 is closed and sealed as shown in FIG. 7. The air within the wrap 36 is withdrawn by vacuum pump and the other end 38 of the film wrap 36 is closed and sealed.

The film wrap 36 presents a barrier to oxygen and hermetically seals the wrapped containers. The film wrap prevents oxygen from contacting the permeable plastic containers and permeating through the containers to spoil the beverage product. By preventing oxygen permeation, the unrefrigerated shelf life of the beverage is significantly increased. In addition to forming an oxygen barrier, the wrap 36 also joins multiple containers together in a package. While three containers are shown wrapped together in the film wrap 36, it will be appreciated that any number of containers can be contained within one film wrap.

The barrier film wrap is removed from the containers prior to consumption of the beverage. With the barrier film removed, the separate components, i.e. the blow molded container 10 and the barrier film wrap 36 can be easily recycled as each component contains a single material. The beverage package of the present invention is therefore advantageous when compared to current paper juice boxes having several layers of different materials laminated together.

Figure 10:
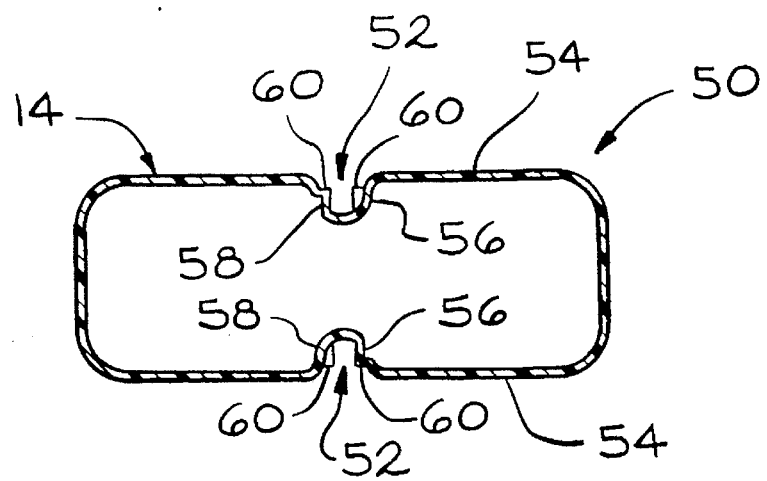
FIG. 10 is a sectional view of the container side wall as seen from substantially the line 10—10 of FIG. 9.

A second embodiment of the blow molding container is shown in FIGS. 9 and 10 and indicated generally at 50. Container 50, like container 10, includes a bottom wall 12, an upright side wall 14 and a top wall 16. The top wall 16 includes an opening 18 for filling the container with a beverage product. Container 50 differs from container 10 in two major respects. The container 50 includes a recessed straw groove 52 in each major face 54 formed by the generally rectangular side wall 14. By providing a straw groove in both major faces of the side wall, there is no longer a correct and an incorrect orientation of the container on a conveyor line. Regardless of which face is positioned toward the straw insertion equipment, there will be a groove for receiving the straw. The presence of the straw groove acts to increase the column stiffness of the side wall which is important during the application of the seal 20 on the opening 18. The container thus benefits structurally from the unused straw groove.

The straw groove 52 differs from the groove 22 shown in container 10. The groove 52 does not extend through the top wall 16 of the container. Rather, the upper end 56 of the straw groove is below the top wall 16. This strengthens the side wall 14 from inward deflection of the major faces 54.

The straw grooves act as creases in the side wall which facilitate inward deflection of the side wall. By terminating the groove short of the top wall 16, the top wall provides a transverse flange extending across the groove providing resistance to inward deflection of the major faces 54.

The grooves 52 have spaced sides 56 and 58 which project into the container. Resilient projections 60, like projections 23, are formed which extend into the groove to frictionally engage the straw 24 and hold it in the groove.

While the invention of the recyclable beverage package includes the blow molding container with an oxygen barrier wrap, it will be appreciated that the blow molded container with a groove for a straw has utility by itself. The container can be made of other plastic materials such as polyethylene terephthalate (PET) which do not need a barrier wrap or the container can be blow molded with a multiple resin layer structure in which one resin layer provides the necessary oxygen permeability barrier. Obviously, it is preferred to use a single material in the blow molding container to facilitate recycling.

It is to be understood that the invention is not limited to the exact construction illustrated and described above, but that various changes and modifications may be made without departing from the spirit and scope of the invention as defined in the following claims.

I claim:

1. A blow molded plastic container for a beverage comprising:

a bottom wall;

a top wall spaced above said bottom wall;

an upright side wall extending between said bottom wall and said top wall, said side wall being configured to form an upright elongated recessed groove, said recessed groove projecting into said container and being straight and of a size to receive a single straw for use in drinking a beverage from said container, said groove having transversely spaced opposite sides projecting into said container, a single straw entirely disposed in said groove on said side wall, three projections extending transversely of said groove and projecting into said groove from said spaced sides for frictionally engaging said straw in said groove so as to hold the straw in said groove, two of said projections being on one side of said groove and a third of said projections being on the other side of said groove intermediate the other two of said projections, said groove terminating at an upper end disposed below said top wall with said top wall forming a transverse flange extending across said groove at said upper end;

said top wall having an opening therethrough for filling and emptying of said container; and said single straw entirely disposed in said groove in said side wall in frictional engagement with said projections so as to grip said straw from opposite sides within said groove, said straw being removable from said groove and insertable into the container through said top wall opening.

2. The container of claim 1 wherein said side wall is generally rectangular in horizontal cross section having a pair of opposite spaced major faces with each of said major faces containing one of said recessed grooves projecting into said container.

3. The container of claim 1 wherein said straw is of telescoping construction so that it can be contracted to a size enabling it to be entirely disposed in said groove in said side wall, and so that it can be removed from said groove and extended to its full length.

* * * * *

UNITED STATES PATENT AND TRADEMARK OFFICE
CERTIFICATE OF CORRECTION

PATENT NO. : 5,460,264
DATED      : October 24, 1995
INVENTOR(S) : Samuel J. Rupert It is certified that error appears in the above-indentified patent and that said Letters Patent is hereby corrected as shown below: On the title page: Item [54] and Column 1, line 1, should read -- Recyclable Blow Molded Container with Removable Straw --

Column 4, Line 38, Claim 1, after "groove" delete "on" and insert --in--.

Signed and Sealed this

Sixteenth Day of April, 1996

Attest:

BRUCE LEHMAN

Attesting Officer    Commissioner of Patents and Trademarks